United States Patent
Kawase et al.

(10) Patent No.: US 10,106,023 B2
(45) Date of Patent: Oct. 23, 2018

(54) VEHICULAR DOOR STRUCTURE

(71) Applicant: HONDA MOTOR CO., LTD., Tokyo (JP)

(72) Inventors: Takahiro Kawase, Wako (JP); Hiroyuki Takagai, Wako (JP); Kazuaki Hiwatashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/331,021

(22) Filed: Oct. 21, 2016

(65) Prior Publication Data

US 2017/0113528 A1 Apr. 27, 2017

(30) Foreign Application Priority Data

Oct. 22, 2015 (JP) ................................. 2015-207698

(51) Int. Cl.
| | | |
|---|---|---|
| *B60J 5/04* | (2006.01) | |
| *B60J 10/40* | (2016.01) | |
| *B60J 10/30* | (2016.01) | |
| *B60J 10/78* | (2016.01) | |
| *B60J 10/86* | (2016.01) | |

(52) U.S. Cl.
CPC ............. *B60J 10/40* (2016.02); *B60J 10/30* (2016.02); *B60J 10/78* (2016.02); *B60J 10/86* (2016.02)

(58) Field of Classification Search
CPC ... B60J 10/40; B60J 10/86; B60J 10/30; B60J 10/78
USPC .............................. 49/502; 296/146.2, 146.5
See application file for complete search history.

(56) References Cited

U.S. PATENT DOCUMENTS

| | | | | |
|---|---|---|---|---|
| 4,432,167 A | * | 2/1984 | Watanuki | ............... B60J 5/0404 49/502 |
| 4,747,232 A | * | 5/1988 | Stephenson | ................ B60J 1/14 49/376 |
| 5,697,665 A | * | 12/1997 | Itou | ......................... B60J 5/0404 296/146.1 |
| 5,746,471 A | * | 5/1998 | Teramoto | ................ B29C 70/72 296/146.1 |
| 7,156,449 B2 | * | 1/2007 | Vijaywargiya | ......... B60J 5/0404 248/475.1 |
| 8,506,098 B2 | * | 8/2013 | Murata | ................... B60J 5/0404 248/466 |

(Continued)

FOREIGN PATENT DOCUMENTS

| | | | | | |
|---|---|---|---|---|---|
| JP | | 58000415 A | * | 1/1983 | ................ B60J 1/14 |
| JP | | 60088628 A | * | 5/1985 | ............ B60J 5/0404 |

(Continued)

*Primary Examiner* — Jerry E Redman
(74) *Attorney, Agent, or Firm* — Westerman, Hattori, Daniels & Adrian, LLP

(57) ABSTRACT

When a first weather strip is mounted in a door panel, first, a hook portion of the first weather strip is locked to a lock hole formed so as to be open in the door panel. Next, a clip portion of the first weather strip is engaged with a clip hole formed so as to be open in the door panel. A second weather strip is mounted on an opposite side of the door panel opposite to the first weather strip. With the above, the first weather strip and the second weather strip are mounted in the door panel from both directions extending in the vehicle width direction, and a first lip of the first weather strip and a second lip of the second weather strip continue in a longitudinal direction.

19 Claims, 7 Drawing Sheets

(56) References Cited

U.S. PATENT DOCUMENTS

| | | | | |
|---|---|---|---|---|
| 9,010,841 B1* | 4/2015 | Kwolek | ............... | B60R 13/0243 296/146.7 |
| 2010/0064591 A1* | 3/2010 | Iwabuchi | ................ | B60R 13/04 49/499.1 |
| 2010/0064592 A1* | 3/2010 | Ohe | ....................... | B60J 5/0404 49/502 |
| 2010/0115851 A1* | 5/2010 | Nakao | .................... | B60J 5/0402 49/502 |
| 2011/0113697 A1* | 5/2011 | Sachdev | ................ | B60J 5/0425 49/502 |
| 2011/0296764 A1* | 12/2011 | Sawatani | ................ | B60R 13/04 49/502 |
| 2015/0135600 A1* | 5/2015 | Yokota | .................. | B60J 5/0402 49/502 |

FOREIGN PATENT DOCUMENTS

| | | | | | |
|---|---|---|---|---|---|
| JP | | 61188227 A | * | 8/1986 | ............ B60J 5/0404 |
| JP | | 2006-116997 A | | 5/2006 | |

* cited by examiner

VEHICULAR DOOR STRUCTURE

CROSS REFERENCES TO RELATED APPLICATIONS

The present application claims priority under 35 U.S.C. § 119 to Japanese Patent Application No. 2015-207698, filed Oct. 22, 2015, entitled "Vehicular Door Structure." The contents of this application are incorporated herein by reference in their entirety.

TECHNICAL FIELD

The present disclosure relates to a vehicular door structure.

BACKGROUND

A conventional vehicular door structure is known in which weather strips that hide the gap between a vehicle body and a door are mounted through brackets (Japanese Unexamined Patent Application Publication No. 2006-116997, for example). In such a vehicular door structure, brackets are formed in the door to fix the weather strips.

SUMMARY

However, in such a conventional vehicular door structure, when the brackets are formed in the door, the size in a vehicle width direction becomes larger in accordance with the dimensions of the brackets and the entire vehicle body becomes disadvantageously large. Furthermore, there is a problem in that due to the weight increased by the weight of the brackets, weight reduction is difficult to achieve. Furthermore, by mounting the weather strips in the door with clips, reduction in weight may be achieved but when considering the need for obtaining the length from the head portions to the tail portions of the clips, reduction in size is, after all, still difficult to achieve. The present disclosure provides a vehicular door structure that is capable of reducing a protruding dimension in a vehicle width direction compared with a protruding dimension in the vehicle width direction in a case in which brackets are provided in the panel of the vehicle body.

A vehicular door structure according to one aspect of the present disclosure provided in a vehicle body includes a first weather strip provided with a hook portion, a panel provided with a hole portion to which the hook portion is locked, a second weather strip positioned on a vehicle outer side with respect to the hook portion, the second weather strip including a fastener point in the panel and being fastened to the fastener point, a long first lip provided in the first weather strip, the first lip covering a gap between the vehicular door structure and the vehicle body, and a long second lip provided in the second weather strip, the second lip covering the gap between the vehicular door structure and the vehicle body.

In such a configuration, the first weather strip is mounted in the panel by having the hook portion be locked to the hole portion of the panel. The second weather strip is fastened to the fastener point of the panel. The second lip of the second weather strip, which is mounted in the panel in a more steadfast manner with respect to the steadfastness of the locking of the hook portion, hides the gap between the vehicle body and the vehicular door structure together with the first lip of the first weather strip.

Furthermore, the first lip and the second lip are provided so as to continue in the longitudinal direction. In other words, by continuously providing, in the longitudinal direction, the two first lip and second lip provided in the first weather strip and the second weather strip, respectively, that are different members, the first lip and the second lip are not easily perceived as different members. Accordingly, it will be possible to create a sense of unity and the appearance quality can be improved.

Furthermore, a front end of the second lip is positioned in front of a front end of the first lip in a vehicular front-rear direction at a front edge of a window opening of a front side door. Accordingly, by fixing the second weather strip provided in the second lip in a further steadfast manner, the second lip can be disposed as a blind of the gap between the vehicle body and the front side door; accordingly, the possibility of the gap being disadvantageously exposed can be reduced reliably.

Furthermore, by configuring the first lip, which is not easily visually observed by its direct appearance, to be shorter than the second lip, not only can reduction of weight through reduction in size of the first lip itself be achieved, but the manufacturing cost can be reduced.

Furthermore, a stopper that abuts against the second weather strip in a vehicular front-rear direction is formed in the panel. Accordingly, in a state in which the second weather strip abuts against the stopper, the front end of the second lip can be configured to be positioned in a front portion of the vehicle with respect to the front end of the first lip. Accordingly, the second weather strip can be set into position easily when mounting the second weather strip, and an increase in manufacturing cost can be suppressed without an increase in weight.

The present disclosure can provide, for example, a vehicular door structure that is capable of reducing the protruding dimension in the vehicle width direction compared with the protruding dimension in the vehicle width direction in a case in which brackets are provided in the panel of the vehicle body.

BRIEF DESCRIPTION OF THE DRAWINGS

The advantages of the disclosure will become apparent in the following description taken in conjunction with the following drawings.

DETAILED DESCRIPTION

Figure 1:
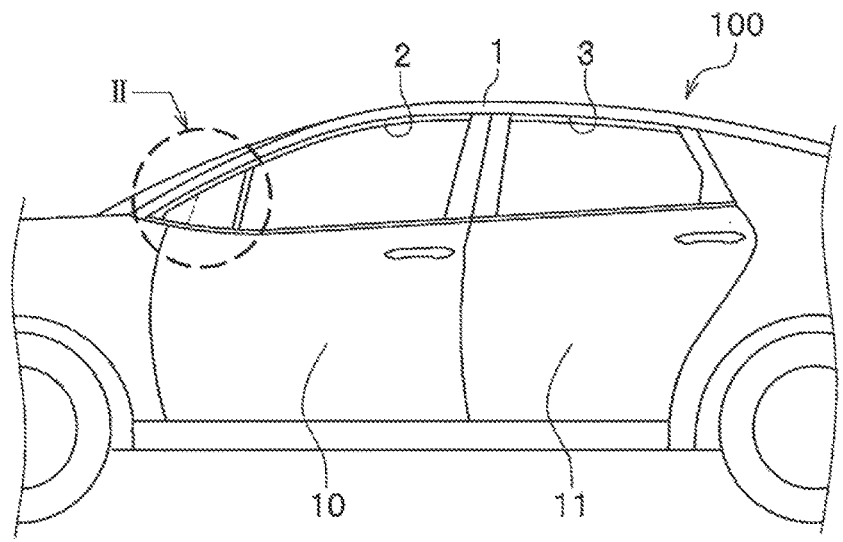
FIG. 1 is a side view of a vehicle body of a vehicle of an exemplary embodiment viewed from the side.

Referring to FIGS. 1 to 10, an exemplary embodiment of the present disclosure will be described in detail. In the description, the same elements are designated with the same reference numerals and redundant description will be omitted. Furthermore, directions described herein are based on the front, rear, left, right, up, and down according to a driver of a vehicle. Note that a vehicle width direction and a left-right direction mean the same.

As illustrated in FIG. 1, door openings 2 and 3 are formed in a vehicle body 1 of a vehicle 100 of the exemplary embodiment. Front and rear side doors 10 and 11 are mounted in the door openings 2 and 3, respectively, through hinges (not shown).

Figure 2:
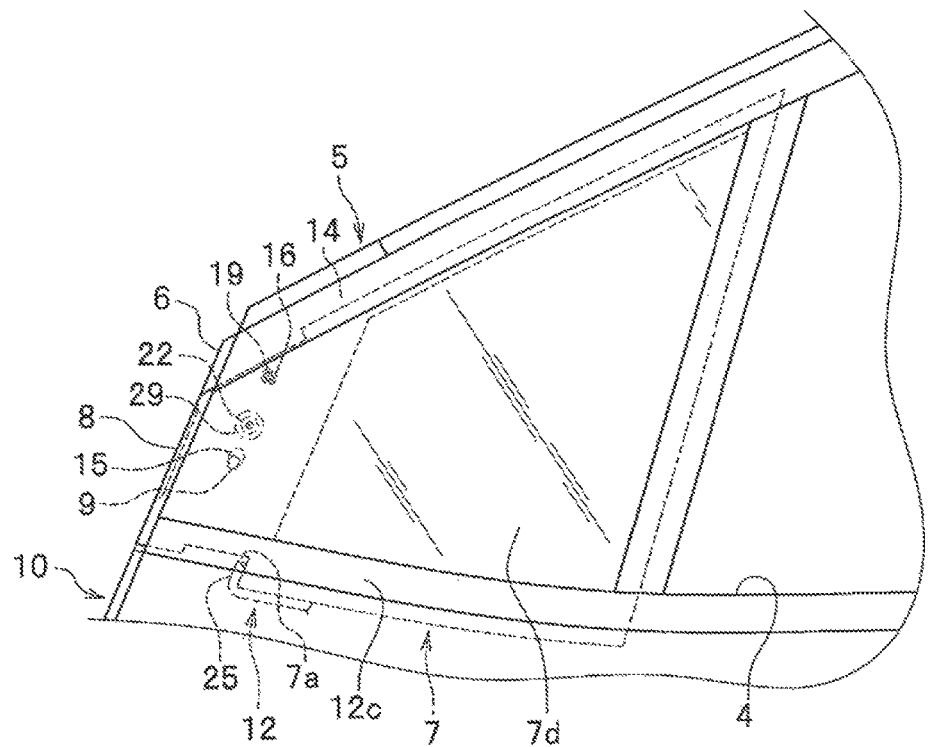
FIG. 2 illustrates a vehicular door structure according to the exemplary embodiment and is an enlarged side view of a portion II in FIG. 1.

FIG. 2 is an enlarged side view illustrating a portion II in FIG. 1. The front side door 10 of the exemplary embodiment includes a first weather strip 5 that positions a hook portion 9 to a front edge of a window opening 4, a door panel 12 serving as a panel provided with a lock hole 15 that locks the hook portion 9 thereto, second weather strip 7 that is positioned on a vehicle outer side with respect to the hook portion 9, the second weather strip 7 including a fastener point in the door panel 12 and being fastened to the door panel 12, a long first lip 6 provided in the first weather strip 5 and that covers a gap between the front side door 10 an the vehicle body 1, a long second lip 8 provided in the second weather strip 7 and that covers a gap between the front side door 10 and the vehicle body 1. Furthermore, the first lip 6 and the second lip 8 are mounted in a front edge portion of the door panel 12 so as to continue in a longitudinal direction such that the elongated directions of the first lip 6 and the second lip 8 extend along an up-down direction of the vehicle.

Figure 3:
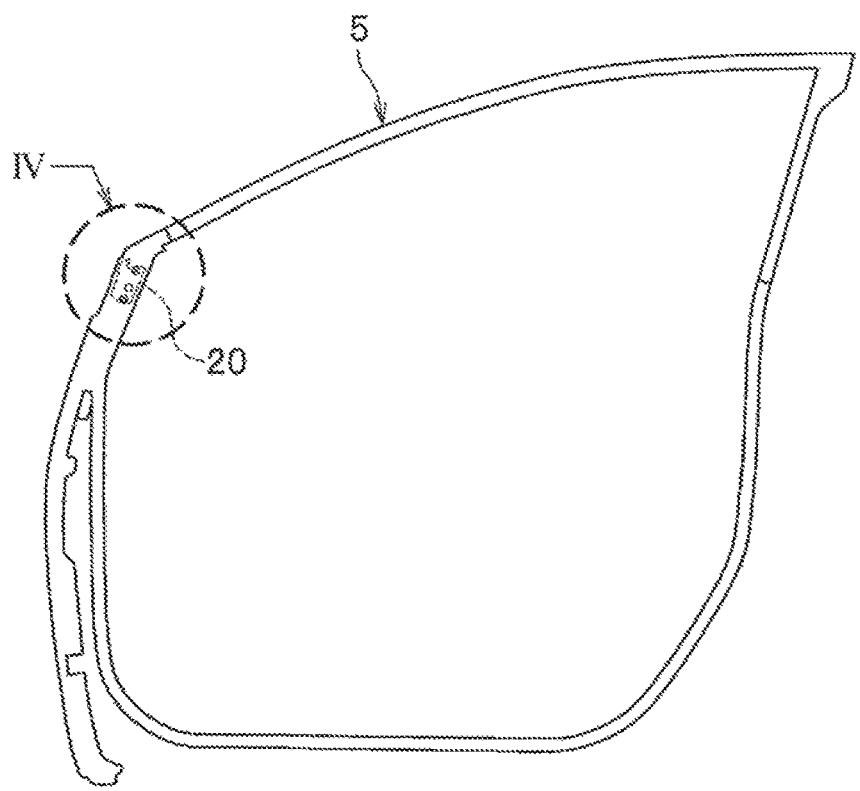
FIG. 3 is a side view of a first weather strip of the vehicular door structure of the exemplary embodiment.

FIG. 3 is a side view of the first weather strip 5 of a vehicular door structure of the exemplary embodiment. The first weather strip 5 is formed in a substantially annual manner along an outer periphery of the front side door 10. Furthermore, the first weather strip 5 is formed of rubber. Furthermore, the first weather strip 5 is configured to abut against a periphery of the door opening 2 on the vehicle body 1 side in a water-tight manner when the front side door 10 is closed.

Figure 4:
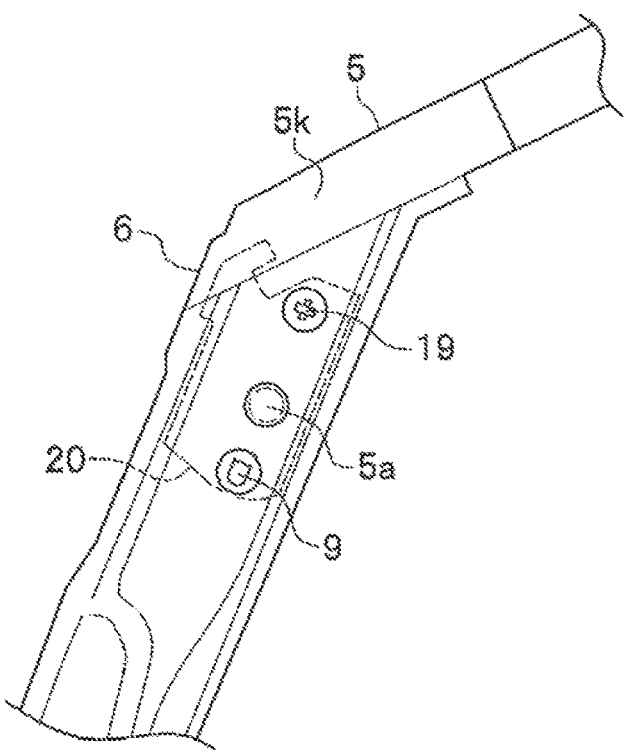
FIG. 4 is an enlarged side view of a portion IV of the vehicular door structure of the exemplary embodiment in FIG. 3.

FIG. 4 is a side view of an enlarged portion IV of the vehicular door structure of the exemplary embodiment in FIG. 3. A connection member 20 is embedded by insert molding in an upper edge corner portion 5k of the first weather strip 5 disposed at the front edge of the window opening 4.

Figure 5:
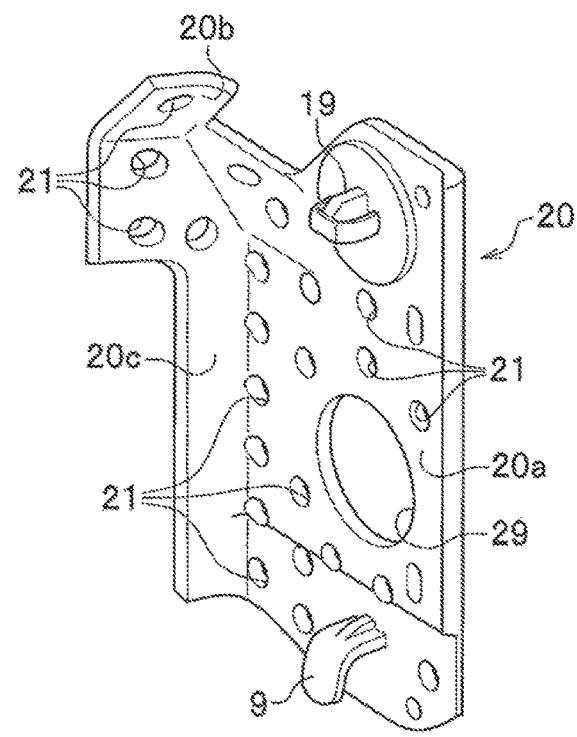
FIG. 5 is a perspective view of a connection member of the vehicular door structure of the exemplary embodiment on which insert molding is performed.

FIG. 5 is a perspective view of the connection member 20 embedded by insert molding in the first weather strip 5 of the vehicular door structure of the exemplary embodiment. The connection member 20 of the exemplary embodiment includes a tabular, vertically mounting surface 20a, a corner flange portion 20b that is provided in an erect manner substantially orthogonal to the vertically mounting surface 20a and that is curved in accordance with a bent shape of the upper edge corner portion 5k positioned in a vicinity of the front edge portion of the door panel 12, and a front end flange portion 20c extending so as to coincide with the front edge portion of the door panel 12.

Furthermore, the hook portion 9 locked to the lock hole 15 of the door panel 12 and a clip portion 19 engaged with the door panel 12 are each provided on a lateral side of the vertically mounting surface 20a on the vehicle outer side in a protruding and integral manner. Among the above, the hook portion 9 is formed in a substantially L-shape in side view in which a distal end thereof is bent downwards at a substantially right angle from a horizontal surface serving as a base portion provided in a protruding manner. Furthermore, the clip portion 19 is formed in an umbrella-shape in side view in which a pair of elastically deforming left and right locking pieces are integrally formed from a column-shaped base portion. As illustrated in FIG. 4, the hook portion 9 and the clip portion 19 are exposed on the door panel 12 side while the connection member 20 is embedded in the first weather strip 5.

Furthermore, a bolt insertion hole 29 open for a bolt connecting the door panel 12 and the second weather strip 7 to each other is formed between the hook portion 9 and the clip portion 19. An inside diameter of the bolt insertion hole 29 is set larger than an outside diameter of a head portion of a bolt member 22 described later so that the head portion of the bolt member 22 can be freely inserted and removed through the bolt insertion hole 29. The bolt insertion hole 29 is formed so as to correspond to the position of a bolt recess portion 5a illustrated in FIG. 4. The bolt recess portion 5a is formed in a recessed manner so as to, in a state described later in which the second weather strip 7 is mounted, function as a space that avoids the head portion of the bolt member 22 used to mount the second weather strip 7.

Figure 6:
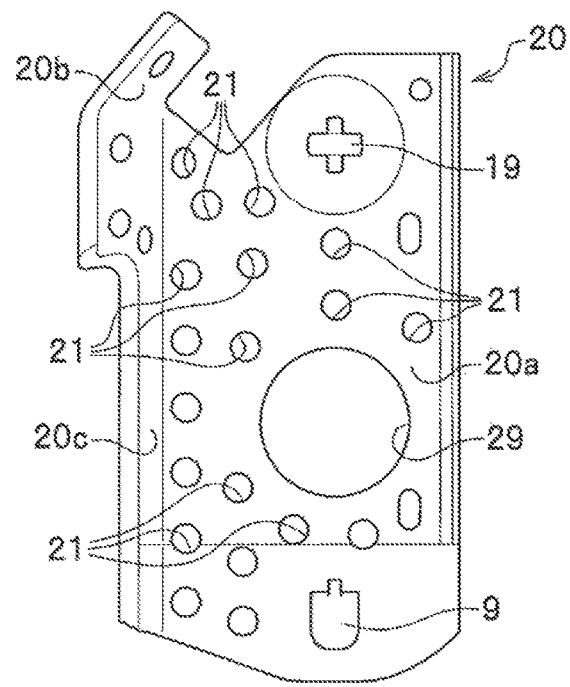
FIG. 6 is a side view of the connection member of the vehicular door structure of the exemplary embodiment.

FIG. 6 is a side view of the connection member 20 of the vehicular door structure of the exemplary embodiment. A plurality of lightening holes 21 are open in the connection member 20 of the exemplary embodiment so as to reduce weight. Furthermore, in the connection member 20 of the exemplary embodiment, when insert molding is performed, a rubber material that constitutes the first weather strip 5 is filled inside each of the lightening holes 21 such that the rubber material at the front side and that at the back side are connected to each other. With the above, the binding of the connection member 20 inside the first weather strip 5 becomes stronger.

Figure 7:
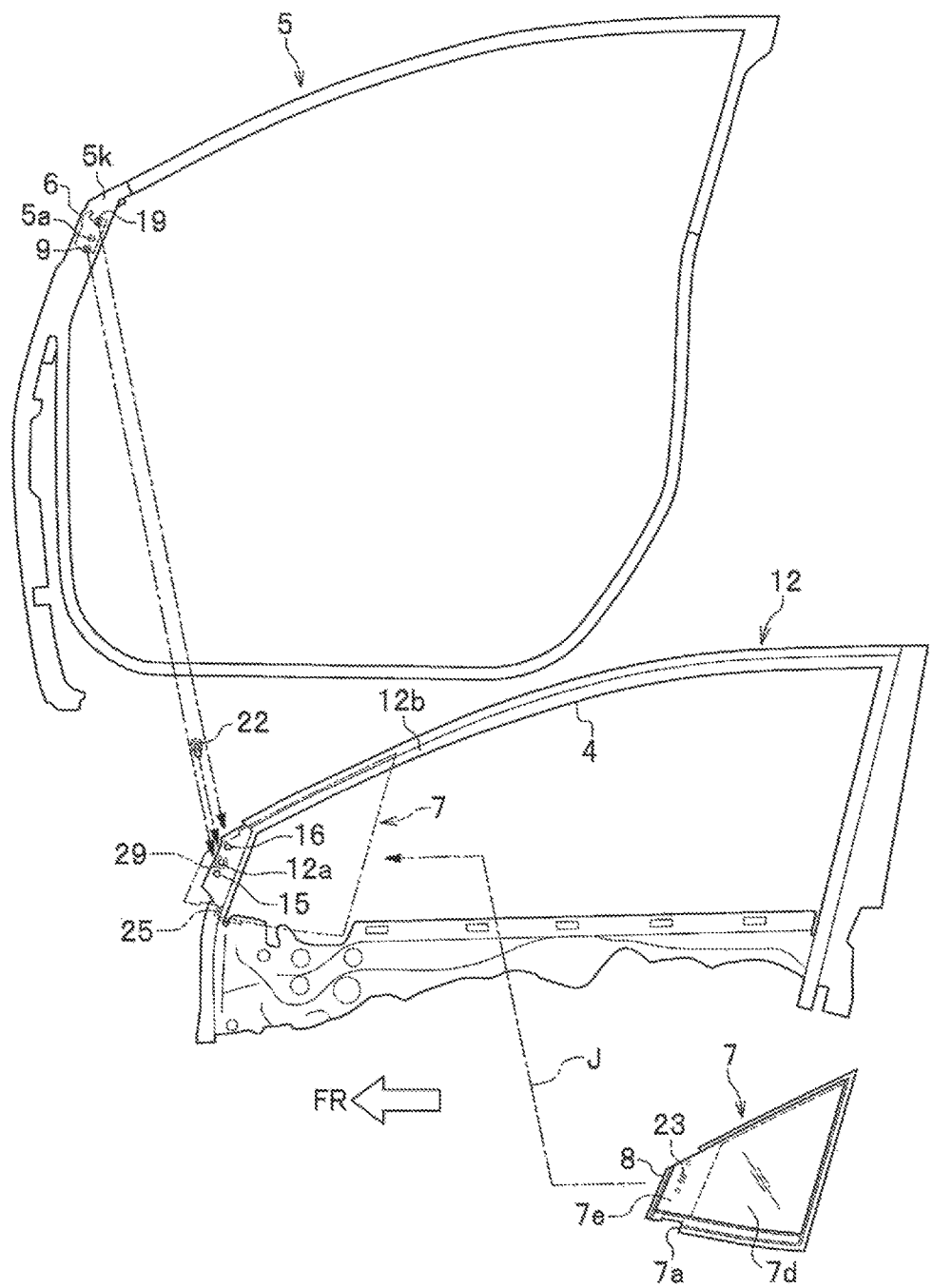
FIG. 7 is an exploded perspective view illustrating a manner in which the first weather strip and a second weather strip of the vehicular door structure of the exemplary embodiment are mounted in a door panel.

FIG. 7 is an exploded perspective view illustrating a manner in which the first weather strip 5 and the second weather strip 7 of the vehicular door structure of the exemplary embodiment are mounted in the door panel 12. The second weather strip 7 is formed of rubber. Furthermore, the second weather strip 7 is provided so as to fit around a periphery of a substantially trapezoidal glass panel member 7d in side view. Furthermore, a recessed step portion 7a is provided at a lower edge of the second weather strip 7. Furthermore, the second weather strip 7 is integrally formed with the rubber second lip 8 positioned at the front edge of the window opening 4.

Furthermore, the second weather strip 7 is integrally provided with a mount base portion 7e. The mount base portion 7e is formed so as to be positioned at a vicinity of the front edge of the window opening 4 on the vehicle interior side of the glass panel member 7d. Furthermore, a female screw member 23 into which the bolt member 22 is screwed when mounting the glass panel member 7d in the door panel 12 is embedded in the mount base portion 7e (see FIG. 9).

Meanwhile, the door panel 12 is mainly constituted by an outer panel and an inner panel (not shown) of the front side door 10 (see FIG. 1), and a sash portion 12b that surrounds the window opening. Among the above, the sash portion 12b positioned at a portion of an upper portion of the door panel 12 forms an outer frame of the window opening 4. The sash portion 12b is formed along an inner periphery of the door opening 2 of the vehicle body 1. Furthermore, the first weather strip 5 is adhered to a surface of the sash portion 12b on the vehicle interior side.

Figure 8:
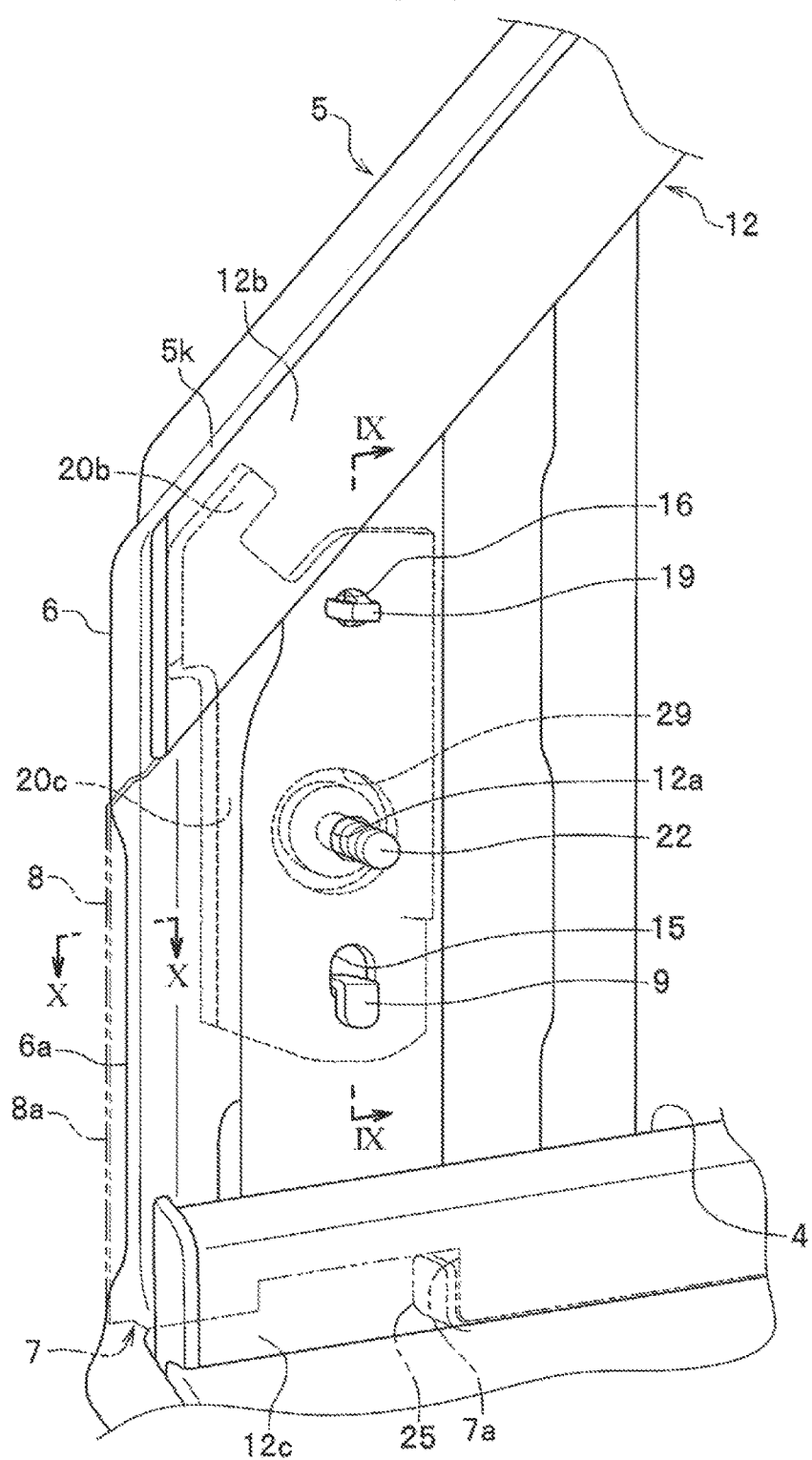
FIG. 8 is an enlarged perspective view of an essential portion illustrating a manner in which the first weather strip of the vehicular door structure of the exemplary embodiment are mounted in the door panel.

FIG. 8 is an enlarged perspective view of an essential portion illustrating a manner in which the first weather strip 5 of the vehicular door structure of the exemplary embodiment are mounted in the door panel 12 serving as a panel. The first lip 6 is provided in an integral manner at a front end of the first weather strip 5. The first lip 6 is protruded a predetermined length towards the front of the vehicle from the sash portion 12b so as to cover a portion between the vehicle body 1 and the sash portion 12b. A front end 6a that is somewhat recessed towards the rear of the vehicle with respect to the other portions is formed in the first lip 6 such that the front end 6a is positioned between a frontal end of each of the upper and lower sash portions 12b and 12c. Furthermore, the tip position of the first lip 6 is arranged with the front end 8a of the second lip 8 described later in the front-rear direction of the vehicle.

In the exemplary embodiment, when the second weather strip 7 is mounted in the door panel 12, first, the second weather strip 7 is slid and moved towards the front of the vehicle to a mounting position at the front edge portion of the window opening 4 illustrated by a two-dot chain line while the second weather strip 7 is pressed from the outside in the vehicle width direction towards the inside as illustrated by arrow J in FIG. 7.

In so doing, as illustrated in FIG. 2, by abutting the step portion 7a of the second weather strip 7 against a stopper 25 formed integrally with the door panel 12, the position of the second lip 8 can be stopped at a desired position in the front-rear direction of the vehicle. Subsequently, the bolt member 22 is inserted from the vehicle interior side in the vehicle width direction through a bolt fastening hole 12a formed in the door panel 12. The bolt member 22 is screwed into the female screw member 23 illustrated in FIG. 9 and the second weather strip 7 is fastened and fixed to the door panel 12.

Subsequently, the first weather strip 5 is mounted in the font edge portion of the window opening 4 of the door panel 12. The hook portion 9 of the first weather strip 5 is locked to the lock hole 15 formed so as to be open in the door panel 12. Subsequently, the clip portion 19 of the first weather strip 5 is engaged with a clip hole 16 formed so as to be open in the door panel 12. With the above, the front edge portion of the first weather strip 5 in which the connection member 20 is embedded is fixed to the front edge portion of the window opening 4 of the door panel 12. Accordingly, the first weather strip 5 and the second weather strip 7 are integrally mounted on both sides of the door panel 12.

In so doing, by disposing the second lip 8 of the second weather strip 7 at where the somewhat lower front end 6a of the first lip 6 of the first weather strip 5 is positioned, the longitudinal direction of the first lip 6 and the longitudinal direction of the second lip 8 are disposed so as to be arranged in a straight line in the up-down direction of the vehicle at the front edge portion of the window opening 4 and continue in the longitudinal direction. Accordingly, even if the front edge portion of the window opening 4 may possibility be exposed due to the first weather strip 5 alone not being able to cover the gap between the vehicle body 1 and the door panel 12, the second lip 8 covering the gap can make the gap not visible from the outside.

Figure 9:
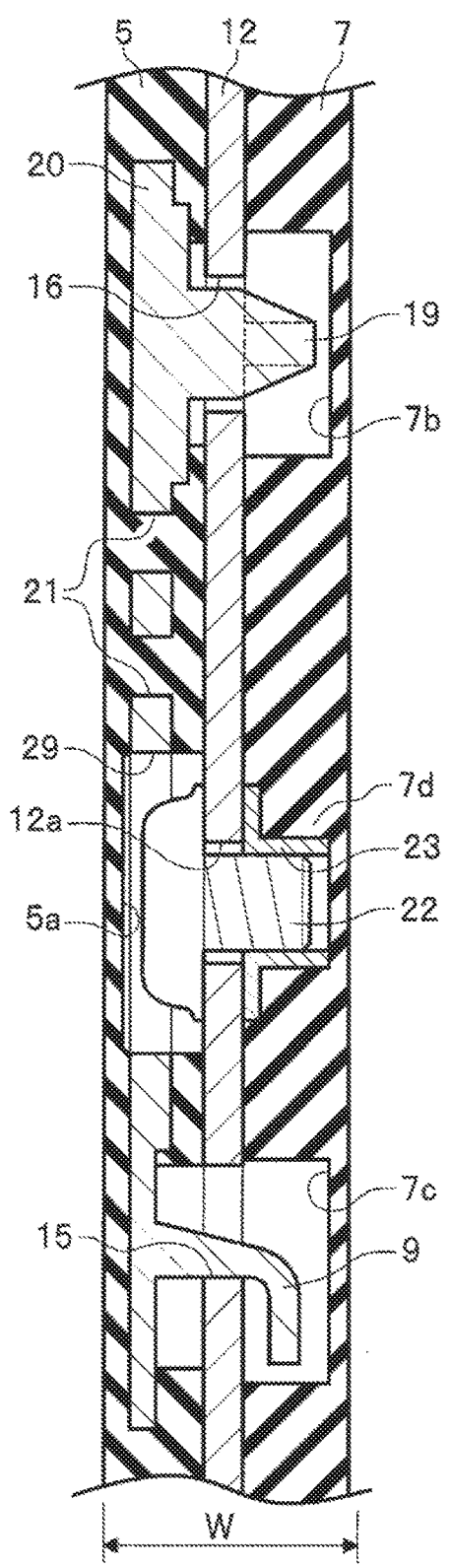
FIG. 9 is a cross-sectional view of the vehicular door structure of the exemplary embodiment taken along line IX-IX in FIG. 8.

FIG. 9 is a cross-sectional view of the vehicular door structure of the exemplary embodiment taken along line IX-IX in FIG. 8. In the exemplary embodiment, the hook portion 9 integrally provided in the first weather strip 5 is locked to the lock hole 15 of the door panel 12, and the clip portion 19 engages with the clip hole 16 provided so as to be open in the door panel 12.

Accordingly, if only with the hook portion 9 and the clip portion 19, a gap due to a dimensional error or vibration may disadvantageously occur with the vehicle body 1; however, the second weather strip 7 is fastened with the bolt member 22 capable of fastening in a relatively steadfast manner compared with the clip and the locking hook.

Furthermore, as illustrated in FIG. 2, in the exemplary embodiment, the bolt insertion hole 29 is formed in advance on a straight line connecting the clip portion 19 and the hook portion 9 in the vehicular up-down direction of the second weather strip 7 and between the clip portion 19 and the hook portion 9. Accordingly, the first lip 6 and the second lip 8 can be easily positioned so as to be arranged in a desired straight line by mounting the first weather strip 5 so that the bolt member 22 is at the center position inside the bolt insertion hole 29.

Furthermore, as illustrated in FIG. 7, in the exemplary embodiment, the direction in which the bolt member 22 is fastened, and the engaging direction and the locking direction of the clip portion 19 and the hook portion 9 of the first weather strip 5 are arranged in one direction from the inside towards the outside in the vehicle width direction. Accordingly, ease of mounting work when assembling the door panel is excellent.

Figure 10:
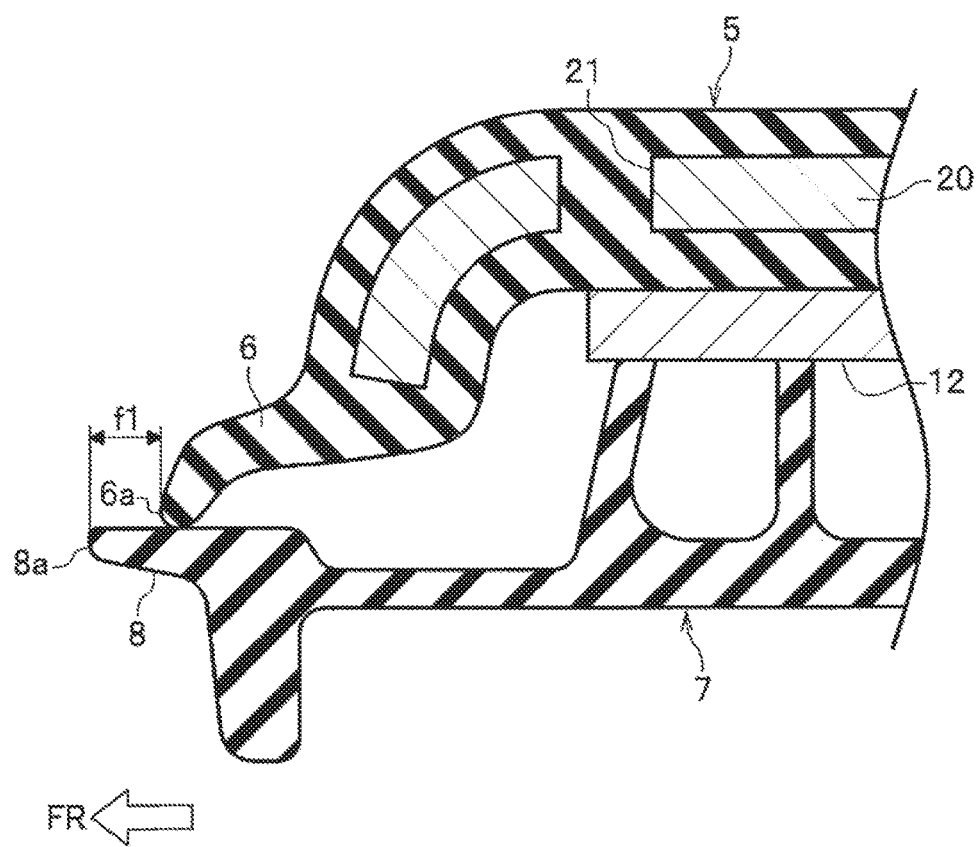
FIG. 10 is a cross-sectional view of the vehicular door structure of the exemplary embodiment taken along line X-X in FIG. 8.

FIG. 10 is a cross-sectional view of the vehicular door structure of the exemplary embodiment taken along line X-X in FIG. 8. In a state in which the step portion 7a of the second weather strip 7 is abutted against the stopper 25 of the door panel 12 (see FIG. 2), as illustrated in FIG. 10, a front end 8a of the second lip 8 is positioned in front of the front end 6a of the first lip 6 in the vehicle front-rear direction FR by a predetermined length f1.

SUMMARY OF ADVANTAGEOUS EFFECTS

Advantageous effects of the vehicular door of the exemplary embodiment will be described next. In the vehicular door of the exemplary embodiment configured in the above manner, the first weather strip 5 is mounted in the door panel 12 by locking the hook portion 9 to the lock hole 15 of the door panel 12 and by engaging the clip portion 19 with the clip hole 16. Compared with a fastening structure using bolts and nuts, the clip portion 19 and the hook portion 9 enables the dimension needed in the vehicle width direction to be set small. Accordingly, the protruding dimension from the vehicle body 1 in the vehicle width direction can be reduced. Therefore, an increase in size of the entire vehicle body 1 can be suppressed and a reduction in weight can be achieved.

Furthermore, the gap between the vehicle body 1 and the front side door 10 is covered by the first lip 6 of the first weather strip 5 including the hook portion 9. In addition to the above, as illustrated in FIG. 10, the front end 8a of the second lip of the second weather strip 7, which is positioned on the vehicle outer side with respect to the hook portion 9, being positioned in front of the front end 6a of the first lip 6 in the vehicle front-rear direction FR by the predetermined dimension f1 can cover the gap that cannot be covered with the first lip 6.

In so doing, compared with the locking of the hook portion 9, the second weather strip 7 is mounted in the door panel 12 in a more steadfast manner with the bolt member 22; accordingly, the gap between the vehicle body 1 and the door panel 12 that cannot be covered by the first lip 6 can be covered reliably. In other words, since the first weather strip 5 is locked to the lock hole 15 with the hook portion 9, even if an unstable state may be disadvantageously encountered, a situation in which the gap between the first lip 6 and the vehicle body 1 is exposed can be averted; accordingly, appearance quality can be improved.

Furthermore, as illustrated in FIG. 9, the head portion of the bolt member 22 is positioned inside the bolt insertion hole 29 provided so as to be open in the connection member 20 and in the bolt recess portion 5a; accordingly, the heat portion does not interfere with the first weather strip 5. Furthermore, the clip portion 19 and the hook portion 9 of the first weather strip 5 are positioned inside a clip recess portion 7b and a hook recess portion 7c provided, in a recessed manner, in the second weather strip 7; accordingly, the clip recess portion 7b and the hook recess portion 7c do not interfere with the second weather strip 7. Moreover, the clip portion 19, the distal end of the bolt member 22, and the hook portion 9 are covered by the second weather strip 7 and do not protrude from the lateral side of the second weather strip 7; accordingly, the clip portion 19, the distal end of the bolt member 22, and the hook portion 9 cannot be seen when viewed in the vehicle external direction and the appearance quality can be made further excellent.

Furthermore, as illustrated in FIGS. 2 and 8, the first lip 6 and the second lip 8 are provided so as to continue in the longitudinal direction. In other words, by continuously providing, in the longitudinal direction, the two first lip 6 and second lip 8 provided in the first weather strip 5 and the second weather strip 7, respectively, that are different members, the first lip 6 and the second lip 8 are not easily perceived as different members. Accordingly, it will be possible to create a sense of unity and the appearance quality can be improved.

Furthermore, as illustrated in FIG. 10, the front end 8a of the second lip 8 is positioned in front of the front end 6a of the first lip 6 in the vehicular front-rear direction FR at the front edge of the window opening 4 of the front side door 10. Accordingly, by fixing the second weather strip 7 provided in the second lip 8 in a further steadfast manner, the second lip 8 can be disposed as a blind of the gap between the vehicle body 1 and the front side door 10; accordingly, the possibility of the gap being disadvantageously exposed can be reduced reliably.

Furthermore, by configuring the first lip 6, which is not easily visually observed in the appearance in a direct manner, to be shorter than the second lip 8, not only achieving reduction of weight through reduction is size of the first lip 6 itself, but the manufacturing cost can be reduced.

Furthermore, in a state in which the stopper 25 that abuts against the second weather strip 7 in the vehicular front-rear direction is formed in the door panel 12 and in which the second weather strip 7 abuts against the stopper 25, the front end 8a of the second lip 8 is positioned in the further forward portion of the vehicle with respect to the front end 6a of the first lip 6 by the predetermined dimension f1. Accordingly, with the abutment of the step portion 7a against the stopper 25, it is possible to confirm that the front end 8a of the second lip 8 is at an appropriate position; accordingly, when mounting the second weather strip 7, positioning can be performed readily and the ease of mounting is excellent.

It goes without saying that while the vehicular door structure according to the present exemplary embodiment has been described above in detail with reference to the drawings, the present disclosure is not limited to the above exemplary embodiment and may be modified as appropriate within the scope of the present disclosure.

For example, in the present exemplary embodiment, description has been given at the position of the front edge of the window opening 4 of the front side door 10 in the vehicular front-rear direction FR as an example; however, not limited to the above position in particular, for example, the description may be given at the position of the rear edge of the rear side door 11. As long as the first weather strip 5 and the second weather strip 7 are mounted in the door panel 12, the shape, the number, and the material of the weather strip are not limited in particular. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicular door structure provided in a vehicle body, the vehicular door structure comprising:
   a first weather strip provided with a hook portion;
   a panel provided with a hole portion into which the hook portion is engaged;
   a second weather strip positioned on a vehicle outer side of the hook portion, the second weather strip being fastened to the panel at a fastener point in the panel;
   an elongated first lip provided in the first weather strip, the first lip covering a gap between the vehicular door structure and the vehicle body; and
   an elongated second lip provided in the second weather strip, the second lip covering the gap between the vehicular door structure and the vehicle body,
   wherein at least one of the first lip and the second lip protrudes forward from a front end of the panel.

2. The vehicular door structure according to claim 1, wherein the first lip and the second lip are configured continuous from one to the other in a longitudinal direction.

3. The vehicular door structure according to claim 1, wherein a front end of the second lip positioned on a front side of the vehicular door structure in a vehicular front-rear direction is positioned in front of a front end of the first lip.

4. The vehicular door structure according to claim 3, wherein the first lip and the second lip protrude forward of a front end of the panel.

5. The vehicular door structure according to claim 1, wherein the panel includes a stopper that abuts against the second weather strip in a vehicular front-rear direction, and
   wherein in a state in which the stopper abuts against the second weather strip, a front end of the second lip protrudes forward more than a front end of the first lip.

6. The vehicular door structure according to claim 1, wherein the first weather strip is provided on an inner side of the panel in a vehicle width direction and the second weather strip is provided on an outer side of the panel in the vehicle width direction, the hook portion protrudes from the hole portion toward the second weather strip, and the second weather strip includes a recess portion to receive a protruding portion of the hook portion.

7. The vehicular door structure according to claim 6, wherein the second weather strip is fastened to the panel by a fastening member through a second hole portion of the panel, the fastening member protruding from the second hole portion toward the first weather strip, and the first weather strip includes a second recess portion to receive a protruding portion of the fastening member.

8. A vehicle comprising the vehicular door structure according to claim 1.

9. A vehicular door structure provided in a vehicle body, the vehicular door structure comprising:

a first weather strip provided with a hook portion;

a panel provided with a hole portion into which the hook portion is engaged;

a second weather strip positioned on a vehicle outer side of the hook portion, the second weather strip being fastened to the panel at a fastener point in the panel;

an elongated first lip provided in the first weather strip, the first lip covering a gap between the vehicular door structure and the vehicle body; and an elongated second lip provided in the second weather strip, the second lip covering the gap between the vehicular door structure and the vehicle body, wherein a front end of the second lip positioned on a front side of the vehicular door structure in a vehicular front-rear direction is positioned in front of a front end of the first lip, and wherein the first lip and the second lip protrude forward of a front end of the panel.

10. The vehicular door structure according to claim 9, wherein the first lip and the second lip are configured continuous from one to the other in a longitudinal direction.

11. The vehicular door structure according to claim 9, wherein the panel includes a stopper that abuts against the second weather strip in a vehicular front-rear direction, and wherein in a state in which the stopper abuts against the second weather strip, a front end of the second lip protrudes forward more than a front end of the first lip.

12. A vehicle comprising the vehicular door structure according to claim 9.

13. A vehicular door structure provided in a vehicle body, the vehicular door structure comprising:

a first weather strip provided with a hook portion;

a panel provided with a hole portion into which the hook portion is engaged;

a second weather strip positioned on a vehicle outer side of the hook portion, the second weather strip being fastened to the panel at a fastener point in the panel;

an elongated first lip provided in the first weather strip, the first lip covering a gap between the vehicular door structure and the vehicle body; and an elongated second lip provided in the second weather strip, the second lip covering the gap between the vehicular door structure and the vehicle body, wherein the first weather strip is provided on an inner side of the panel in a vehicle width direction and the second weather strip is provided on an outer side of the panel in the vehicle width direction, the hook portion protrudes from the hole portion toward the second weather strip, and the second weather strip includes a recess portion to receive a protruding portion of the hook portion.

14. The vehicular door structure according to claim 13, wherein the first lip and the second lip are configured continuous from one to the other in a longitudinal direction.

15. The vehicular door structure according to claim 13, wherein a front end of the second lip positioned on a front side of the vehicular door structure in a vehicular front-rear direction is positioned in front of a front end of the first lip.

16. The vehicular door structure according to claim 15, wherein the first lip and the second lip protrude forward of a front end of the panel.

17. The vehicular door structure according to claim 13, wherein the panel includes a stopper that abuts against the second weather strip in a vehicular front-rear direction, and wherein in a state in which the stopper abuts against the second weather strip, a front end of the second lip protrudes forward more than a front end of the first lip.

18. The vehicular door structure according to claim 13, wherein the second weather strip is fastened to the panel by a fastening member through a second hole portion of the panel, the fastening member protruding from the second hole portion toward the first weather strip, and the first weather strip includes a second recess portion to receive a protruding portion of the fastening member.

19. A vehicle comprising the vehicular door structure according to claim 13.

* * * * *